(No Model.)

R. B. SHELDON.
SPRING HOE FOR SEEDING MACHINES.

No. 292,868. Patented Feb. 5, 1884.

WITNESSES:
Jas. F. DuHamel.
Walter S. Dodge.

INVENTOR
Richard B. Sheldon,
by Dodge & Son,
Attys.

UNITED STATES PATENT OFFICE.

RICHARD B. SHELDON, OF SHORTSVILLE, NEW YORK.

SPRING-HOE FOR SEEDING-MACHINES.

SPECIFICATION forming part of Letters Patent No. 292,863, dated February 5, 1884.

Application filed August 27, 1883. (No model.)

*To all whom it may concern:*

Be it known that I, RICHARD B. SHELDON, of Shortsville, in the county of Ontario and State of New York, have invented certain Improvements in Spring-Hoes for Seeding-Machines, &c., of which the following is a specification.

My invention relates to spring hoes or teeth for grain-drills, seeding-machines, and like implements; and it consists in a novel arrangement of the spring and its connections, as hereinafter fully pointed out.

Figure 1:
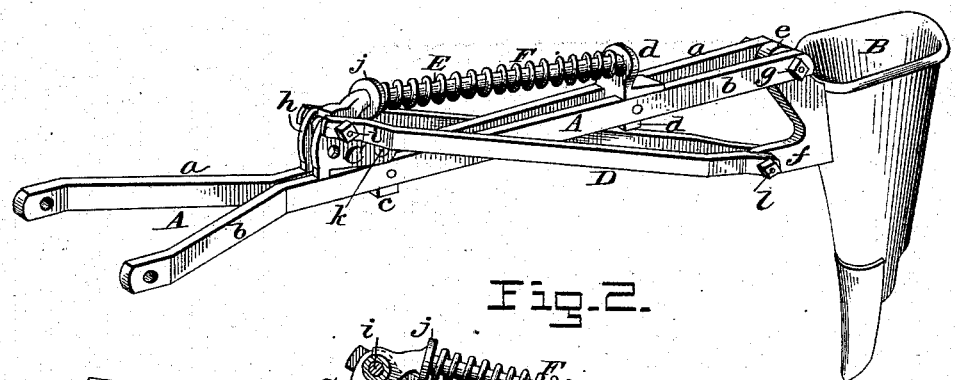
Figure 2:
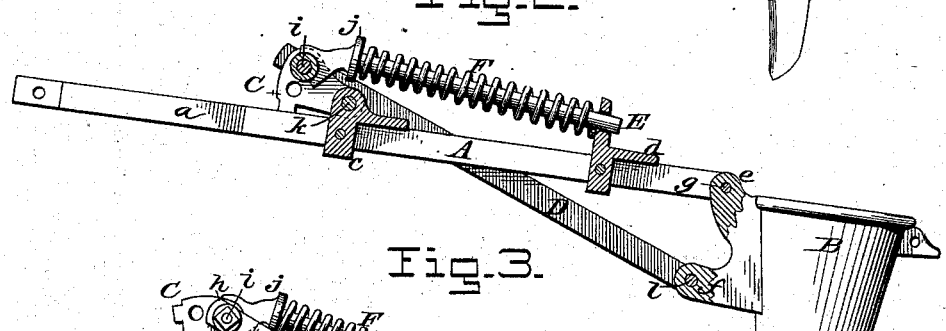
Figure 3:
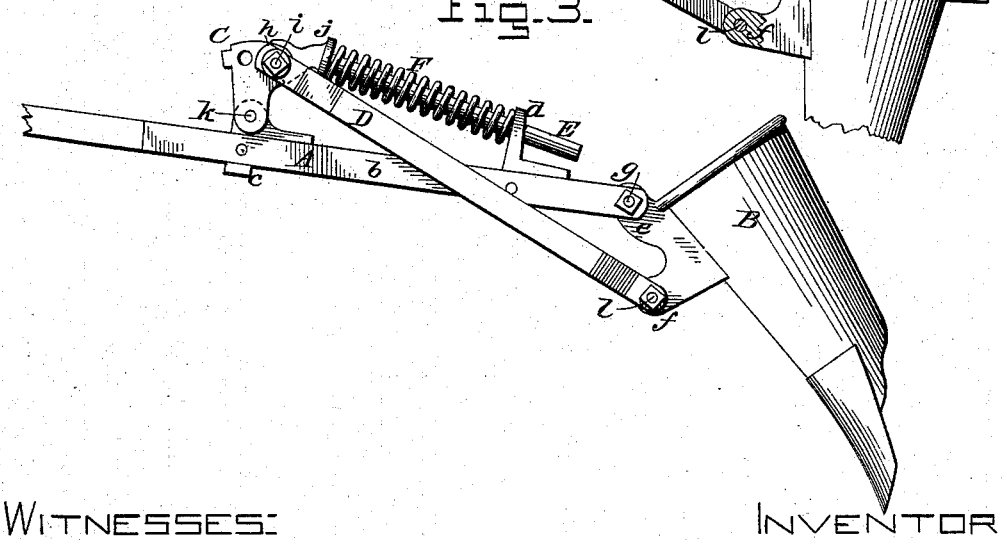

In the drawings attached, Figure 1 represents a perspective view of my improved spring hoe or tooth; Fig. 2, a side elevation with one side of the drag bar or beam broken away; Fig. 3, a similar view with the hoe thrown back.

Spring hoes or teeth of the character herein referred to have long been used, and various arrangements of the spring and the connections between the spring and hoe or tooth have been patented. The present plan is, however, believed to give a more satisfactory and certain action of the spring than has hitherto been attained.

Referring now to the drawings, A represents a drag bar or beam, composed of two bars, *a* and *b*, bolted together with suitable spacing-blocks, *c* and *d*, interposed to give the necessary spread; and B represents the hoe or tooth, formed with ears *e* and *f*, the former and upper one of which is jointed or pivoted to the rear end of drag-bar A, as shown, the ear being inserted between the bars *a b*, and the parts secured together by a bolt, *g*, as usual. The forward block, *c*, is formed with an upwardly-projecting ear or lug, to which is pivoted a block, C, which extends forward and rests upon the upper side of drag-bar A, as shown in Fig. 1. The block C is formed with ears *h* at its forward end, at the upper side, and to and outside of these ears are pivoted draw-bars D, which pass downward and backward outside the two bars of the drag bar or beam A, and are jointed to the ear *f* of hoe or tooth B, as shown in the several figures.

E indicates a rod, the forward end of which is provided with a stirrup or crotch, and bears against lugs on the inner faces of the plates *h*, or may bear against the pin or bolt *i*, connecting the draw-bar D and the block C—a construction which facilitates the assembling or removal of the rod and spring without affecting the other parts. The rear end of the rod is passed through a hole in an ear or upward extension formed upon block *d*, and its body is encircled by a strong spiral spring, F, one end of which bears against a collar, *j*, on the rod near its forward end, and the opposite end of which bears against the block *d*. The pivot-pin *i* of draw-bar D is located just above a line passing through pivot *k* of block C, and pivot or bolt *i* connecting draw-bar D to ear *f* of the hoe or tooth B, so that a considerable strain upon or resistance to the tooth or hoe drawing upon the draw-bar D will cause the block C to swing upward and backward, thereby in turn permitting the hoe or tooth to swing backward, and thus to ride freely over obstructions, as seen in Fig. 3. In thus swinging upon its pivot the block C encounters and acts against the pressure of spring F, which acts to great advantage compared with the draw-rod, owing to its superior leverage, the pivots *i* and *k* being very nearly in line, while the spring acts at a considerable distance above the pivot *k*, as indicated. The relative positions of the pivots cause the hoe to retain its working position until such resistance is encountered as would be liable to injure it, when it swings back, as indicated. The rod E prevents lateral displacement of the spring, and causes it to be evenly compressed during the upward and backward movement of the block C, the spring offering a constantly-increasing resistance to the movement of the block until the obstruction is passed, whereupon the spring throws the block C back to place, the latter carrying with it the hoe or tooth, or until the folds or coils of the spring come into contact with one another, and thereby form a stop to limit the motions of the parts. When, however, this takes place, the hoe or tooth will be at such angle that it will ride out of the ground and over the obstruction, and thus all damage or injury will be averted. These points—the constantly-increasing resistance of the springs, its freedom from danger or possibility of lateral displacement, its location above the drag-bar out of the way of weeds and trash, and its acting by compression and serving to form a stop or limit of motion—all tend to make the peculiar arrangement of the spring herein described and shown peculiarly advantageous.

Having thus described my invention, what I claim is—

1. In combination with a drag-bar and a hoe or tooth pivoted thereto, a block pivoted to the upper side of the drag-bar and extending forward in advance of its pivot, a draw-bar connecting the forward end of said block and the hoe or tooth, a rod bearing against or jointed to the block and extending backward through a guide, and a spring encircling the rod, all combined and arranged to operate substantially as set forth.

2. In combination with a drag-bar and a hoe or tooth pivoted thereto, a block pivoted to the upper side of the drag-bar at its rear end, and connected by a draw-bar with the tooth below the pivot of the latter, a sliding rod connected to the forward upper end of the block, and extending thence backward through a fixed guide on the drag-bar, and a spring encircling the rod, all substantially as and for the purpose set forth.

RICHARD B. SHELDON.

Witnesses:
OLIVER S. TITUS,
HENRY O. KLINCK.